UNITED STATES PATENT OFFICE.

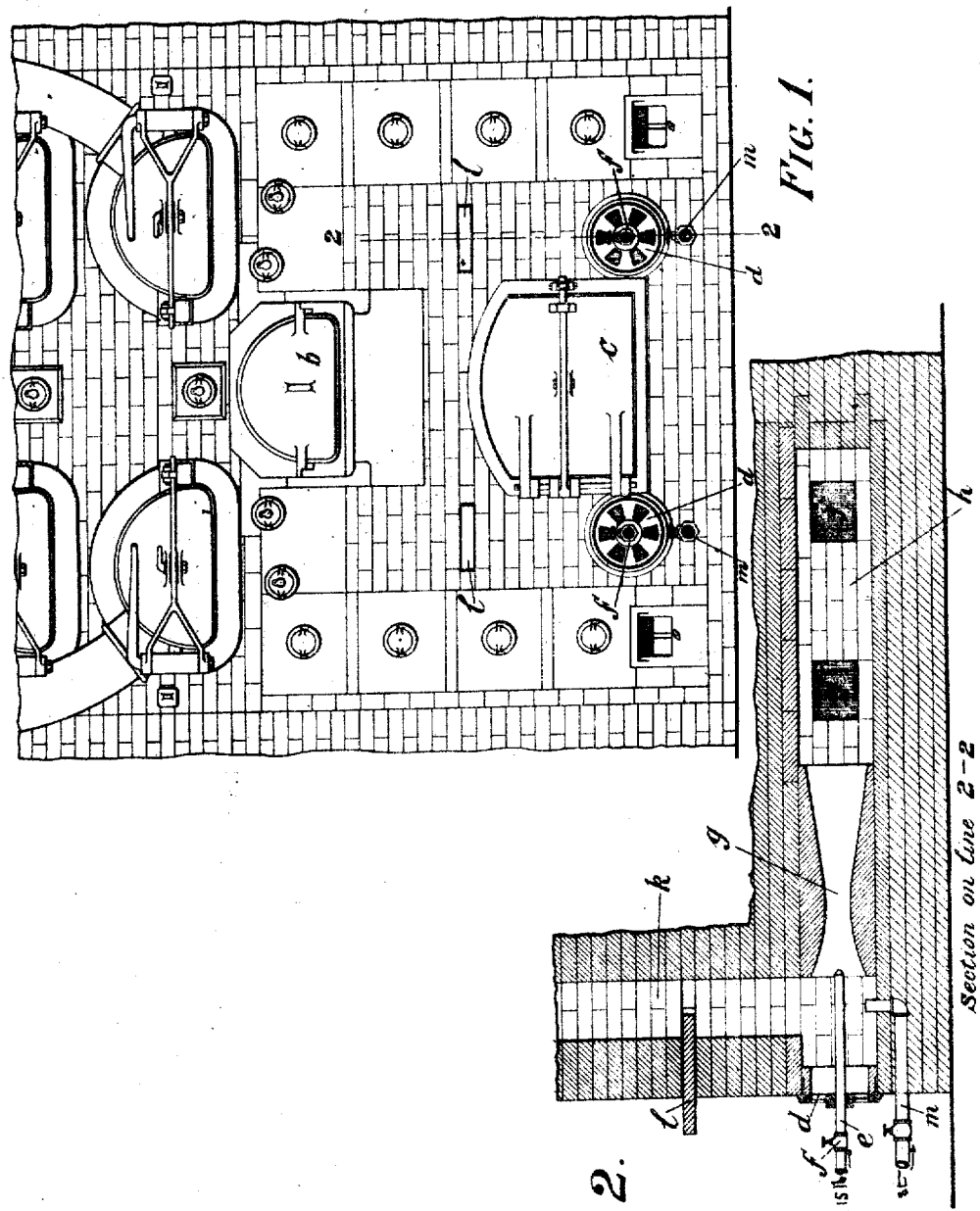

CHARLES BARMORE, JR., OF PATERSON, NEW JERSEY, ASSIGNOR TO THE IMPROVED EQUIPMENT COMPANY, OF NEW YORK, N. Y., A CORPORATION OF COLORADO.

PROCESS OF OPERATING GAS-PRODUCERS.

1,012,120.  Specification of Letters Patent.  Patented Dec. 19, 1911.

Application filed January 27, 1911. Serial No. 605,079.

*To all whom it may concern:*

Be it known that I, CHARLES BARMORE, Jr., a citizen of the United States, and a resident of Paterson, New Jersey, (post-office address, 60 Wall street, New York city,) have invented certain new and useful Improvements in Processes of Operating Gas-Producers, of which the following is a specification, accompanied by drawings.

The improvement relates to the operation of gas producers wherein a substantial quantity of steam is introduced in the draft mixture for the two-fold purpose of restricting clinker formation and at the same time forming a substantial quantity of hydrogen in the producer gas. It is desirable that the steam introduced should be free from water of condensation and preferably very considerably superheated in order that it shall not have too great a physical quenching action upon the fuel bed at the point where the draft mixture first meets the fuel.

The present invention provides a method of regulating and controlling the temperature throughout the fuel bed and economically using steam for the two-fold purpose just mentioned, giving a very uniform quality of gas produced and a convenient and close regulation of the temperature throughout the fuel bed so as to effectively avoid the making of clinkers to an objectionable extent on the one hand, while preventing tendency to quench the fuel and leave unburned carbon in the ashes, on the other hand.

In carrying out the present invention in its most preferred form I inject, by a jet injector, blower, or otherwise, a carefully proportioned draft mixture derived from three sources, namely, atmospheric air, steam, and a sufficient quantity of hot waste products of combustion to raise the temperature of the mixture well above the boiling point of water and materially superheat the steam present. Preferably I employ an injector and use steam as the injecting medium.

The specific heat of steam being very much greater than nitrogen or carbon dioxid, which are the principal constituents of the waste products of combustion, I find that I am able to use the waste flue gases at the highest temperature available and introduce a considerable quantity without raising the temperature of the steam and entire draft mixture beyond the temperature at which they can be conveniently handled by blowers or metallic apparatus.

It is now well recognized that the waste products of combustion can be utilized to carefully regulate the temperature of the fuel bed of a producer and thereby avoid objectionable clinkering, such a process being disclosed in the patent to H. L. Doherty, No. 829,105, granted August 21, 1906. It is advantageous to bring into the fuel bed as much heat as is possible, provided that the heat can be carried in at a temperature not sufficiently high to in itself cause fusing and clinkering. In raising the temperature of the steam by the addition of waste products of combustion under the present improvement, the high specific heat of the steam enables it to take up a proportionately large quantity of heat from the products of combustion without proportionately raising the temperature of the mixture, that is to say, pound per pound, the steam will bring down the temperature of the products of combustion far more than the steam in turn is raised in acquiring the temperature of the entire draft mixture. For the same reason it will be seen that the steam present in being raised on entering the fuel bed to the temperature of combustion therein occurring, physically takes up a disproportionately large quantity of heat as compared with the nitrogen, carbon dioxid and oxygen present. Of course, when the steam meets the incandescent fuel and passes up in the bed, it further acts, as will be well understood, endothermically, to produce hydrogen and carbon monoxid with the absorption of physical heat. From these considerations the advantages of my process of using steam to restrict the temperature and superheating the steam by the products of combustion, which afford me not only a source of waste heat but, to the extent of the carbon dioxid present, an additional quantity of gas capable of reacting endothermically with the fuel with absorption of heat, will be readily understood and appreciated.

As will be readily understood, the temperature to which the fuel bed can be safely raised without producing objectionable clinkering varies with different grades of coal or of the coke formed from such coal;

and the regulation of the mixture will be made with reference to the temperature of the fuel bed which it is desired to maintain. I find it convenient in practice to effect this regulation by increasing or decreasing the amount of air supplied by means of dampers after approximately regulating the quantity of steam and products of combustion that are being mixed together. Under ordinary conditions of atmosphere, dampness of the coal, and temperature of the source of the products of combustion, derived from the combustion chamber of a gas bench, and using in the producer coke from Westmoreland coal, for example, a draft mixture in the proportion of six pounds of air, one-half pound of saturated steam at fifteen pounds' pressure, and one and a half pounds of hot products of combustion, will give an effective draft mixture at a temperature well above boiling, so that the steam is superheated and yet far below incipient red heat. By increasing or decreasing the air supply without materially disturbing the other elements of the mixture, the temperature of the fuel bed of the producer supplied with such mixture can be regulated to a nicety and a substantial quantity of hydrogen is formed in the producer gas without much unreduced water vapor or steam.

In the accompanying drawings one form of apparatus suitable for carrying out the process is illustrated.

Figure 1 is a partial front view of a gas bench of the ordinary interior producer type but supplied with apparatus for carrying out the present invention. Fig. 2 is a vertical cross section on the plane 2—2 of Fig. 1 looking toward the left hand in Fig. 1.

At $b$ is the charging door of the producer; and at $c$ the ash-pit door. At $d$ are air dampers for regulating the admission of air to the draft mixture. The draft is induced by injector mechanism comprising in the illustration a steam injecting nozzle $e$ controlled by a valve $f$, a throat $g$ into which the jet is directed, and draft flue $h$ leading to the openings $j$, extending into the ash-pit grate of the producer, as will be well understood. At $k$ is a down-take flue controlled by dampers $l$ for bringing down a portion of hot waste products of combustion of the bench to heat the steam and air in the draft mixture. This injector mechanism and its connections is duplicated on the respective sides of the producer, as will be apparent from Fig. 1.

As the invention does not reside in the construction of the apparatus, further illustration will be unnecessary, particularly as the construction of a gas-bench provided with similar injecting mechanism and connections is found in the Doherty patent above referred to.

The operation is as follows: Steam is admitted through the injector nozzle $e$ from a source of steam, at say fifteen pounds to the square inch pressure. The current of steam is controlled by the valve $f$. Air is drawn through the openings in the damper $d$ and products of combustion are drawn from the down-take flue $k$ forming an intimate mixture with the steam in the throat $g$ of the injector and passing as an intimate draft mixture through the openings $j$ to the producer.

I have shown an additional steam pipe $m$ for supplying steam to the mixture because it will be clear that the injector could be operated by compressed air instead of steam, the steam then being supplied through the pipe $m$.

In using the injecting medium at low pressure, for example a pressure of a fraction only of a pound, the proportions of the draft mixture passing through the throat $g$ are found to vary with variations in the resistance of the fuel bed. For example, when the fuel bed has been first cleaned and the resistance is a minimum, the action of the injector jet is relatively more efficient and it brings in more of the flue products and air in proportion to the steam passing through the injector nozzle $e$ than when the resistance of the fuel bed has increased by the accumulation of ashes. If the injector nozzle is operated by air at low pressure, the tendency of the increasing resistance is to both actually and relatively decrease the amount of flue products and steam drawn in by the injector and consequently, by the relative increase in oxygen, to raise the temperature of the hot zone of the fuel bed. On the other hand, if the injector medium were steam or if it should be products of combustion, the reverse effect would occur, the proportion of oxygen relative to steam and carbon dioxid being diminished as the resistance of the fuel bed increases. These variations in the regulation I have overcome by using an injector medium under relatively high pressure and carrying the draft mixture through a relatively small throat $g$ at high velocity, so that for practical purposes the effect is constant and the proportion does not change materially with the variations in the resistance of the fuel bed. On account of simplicity of construction and efficiency of operation I prefer the steam injector to air injectors, blowers, or mechanically driven draft propelling means.

I prefer to use steam injectors carrying all the steam used and after adjusting them accordingly, to adjust the flow of products of combustion by the flue dampers $l$ and the flow of air by the air dampers $d$. It will be understood that the relative proportion between steam and hot products will mainly determine the temperature of introduction of the mixture and the degree of superheating of the steam, while varying the amount of air relative to these two will mainly determine the temperature reached at the maximum temperature zone in the producer bed.

My invention is radically distinguished from the mere incidental use of steam as a means for injecting a draft mixture of air and products of combustion by the fact that I utilize the steam in substantial quantities, and in excess indeed of the carbon dioxid present, to both, regulate the temperatures and to furnish hydrogen in the producer gas.

I claim and desire to secure the following:

1. Improvement in operating gas producers comprising supplying to a deep fuel bed an intimately mixed heated draft current of air, hot products of combustion, and steam in excess of the quantity of carbon dioxid present, supplying heat to the mixture by the said hot products and maintaining the mixture materially above the boiling point of water, thereby avoiding quenching of the fuel where the draft enters it, and regulating and restricting the temperature of the fuel bed below the objectionable clinkering point by regulating and restricting the relative proportion of air in the mixture.

2. Improvement in operating gas producers, comprising supplying to a deep producer fuel bed a draft mixture of steam, air, and products of combustion in which the steam in the mixture is superheated and exceeds in volume the carbon dioxid present.

3. Improvement in operating gas producers, comprising supplying to the fuel bed thereof an intimately mixed draft current of air, products of combustion, and steam, the endothermically acting gases present being mainly steam, the products of combustion being introduced to the mixture in a hot state and in sufficient quantity to heat the mixture well above the boiling point of water, and regulating and restricting the proportion of air present to restrict clinker formation.

4. Improvement in operating gas producers with a draft current containing steam as the principal quantity of endothermically acting agent present, which comprises supplying, with air from a relatively cool source and steam, sufficient heated products of combustion to give a temperature to the draft mixture above the boiling point of water and regulating and restricting the proportion of air to restrict clinker formation, substantially as set forth.

In testimony whereof I have signed this specification in the presence of two subscribing witnesses Jan. 25, 1911.

CHARLES BARMORE, Jr.

Witnesses:
E. VAN ZANDT,
E. P. LA GAY.